(12) United States Patent
Karle

(10) Patent No.: US 11,215,903 B2
(45) Date of Patent: Jan. 4, 2022

(54) SOFT BOX MOUNT

(71) Applicant: Stefan Karle, Munich (DE)

(72) Inventor: Stefan Karle, Munich (DE)

(73) Assignee: Stefan Karle, Munich (DE)

(*) Notice: Subject to any disclaimer, the term of this patent is extended or adjusted under 35 U.S.C. 154(b) by 0 days.

(21) Appl. No.: 17/092,077

(22) Filed: Nov. 6, 2020

(65) Prior Publication Data

US 2021/0141288 A1 May 13, 2021

(30) Foreign Application Priority Data

Nov. 11, 2019 (DE) .......................... 102019130371.0
Sep. 17, 2020 (DE) .......................... 102020124286.7

(51) Int. Cl.
*G03B 15/06* (2021.01)

(52) U.S. Cl.
CPC .................... *G03B 15/06* (2013.01)

(58) Field of Classification Search
CPC . G03B 15/06; F16M 11/06; F16B 7/18; F16B 7/042; F21V 7/10
See application file for complete search history.

(56) References Cited

U.S. PATENT DOCUMENTS

| | | | |
|---|---|---|---|
| 6,176,598 B1* | 1/2001 | Seligman | F21V 7/18 362/278 |
| 6,709,121 B1 | 3/2004 | Lowe et al. | |
| 7,497,603 B2* | 3/2009 | Malkanov | F21V 17/10 362/16 |
| 10,203,083 B2* | 2/2019 | Lin | F21V 7/00 |
| 2005/0225989 A1* | 10/2005 | Harlocker | G03B 15/06 362/341 |
| 2008/0137352 A1 | 6/2008 | O'Brien et al. | |
| 2010/0124068 A1 | 5/2010 | Karle | |
| 2014/0071697 A1 | 3/2014 | Portmann | |

(Continued)

FOREIGN PATENT DOCUMENTS

| | | |
|---|---|---|
| CN | 209590496 U | 11/2019 |
| CN | 209842309 U | 12/2019 |
| DE | 202009010094 U1 | 4/2010 |

(Continued)

OTHER PUBLICATIONS

Examination Report of the Great Britain Patent Office for GB Application No. 2017592.3 dated Apr. 13, 2021.

*Primary Examiner* — Evan P Dzierzynski
(74) *Attorney, Agent, or Firm* — Park, Vaughan, Fleming & Dowler LLP; Laxman Sahasrabuddhe

(57) ABSTRACT

Soft box mount, including a receiver block for receiving an expander strut of a soft box. The receiver block includes, in this order, an inward part, a transverse pivot axis, and an outward part, the outward part of the receiver block being configured to receive a proximal end of the expander strut; and a bar block which is configured to be movable between a first, non-use position, in which the inward part of the receiver block may intrude into a recessed part of the bar block, and a second, use position, in which a non-recessed part of the bar block urges, from a light source side, the inward part of the receiver block to assume a position radially inward of the pivot axis of the receiver block, thereby urging the outward part of the receiver block to assume a position radially outward of the pivot axis of the receiver block.

17 Claims, 9 Drawing Sheets

(56) References Cited

U.S. PATENT DOCUMENTS

2014/0270742 A1  9/2014 Karle
2019/0377242 A1* 12/2019 Boerup ................. G03B 15/06

FOREIGN PATENT DOCUMENTS

| DE | 102011052394 A1 | 10/2012 |
| DE | 102013004665 A1 | 9/2014 |
| EP | 0964291 B1 | 1/2003 |
| KR | 1020180061937 A | 6/2018 |
| WO | 2018186536 A1 | 10/2018 |

\* cited by examiner

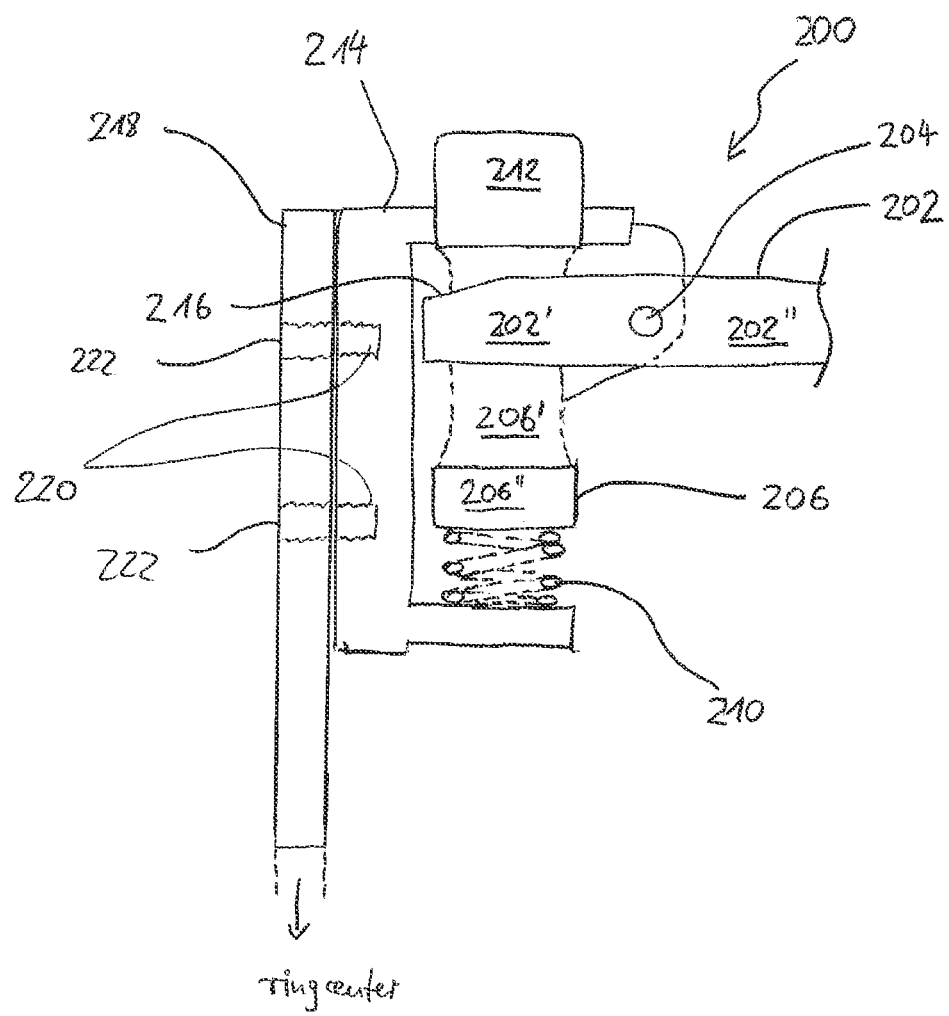

SOFT BOX MOUNT

RELATED APPLICATION

This application claims priority to German Patent Application No. DE 10 2020 124 286.7 and German Patent Application No. DE 10 2019 130 371.0, and the contents of both applications are herein incorporated by reference in their entirety for all purposes.

TECHNICAL FIELD

This invention relates to a light reflector for use in photography and the like.

BACKGROUND

Light reflectors, and more particularly those named soft box light shapers, or simply soft boxes, are universally used in photography and the like for their extremely even light diffusion. Such a light reflector is for instance shown in EP 0 964 291 B1.

In the soft box light shapers, the armature, which is usually ring shaped, is adapted to surround the light source to which it is fastened. The soft box itself usually has a number of ribs, the proximal ends of the ribs being mounted on a transverse axis which is pivotally affixed to the armature. Therefore, the ribs can be pivoted from a use position, in which they extend more or less radially of the armature, thereby expanding the soft box, to/from a non-use position, in which they extend more or less in parallel to the axis of the armature, thereby collapsing the soft box.

Accordingly, the cloth of the soft box may be spread much like an umbrella and may be maintained in that position by some means blocking the ribs from returning to their non-use position. According to EP 0 964 291 B1, this means is provided by longitudinally movable sheaths surrounding each of the proximal ends of the ribs. The sheath, which is biased by a coil spring, may engage in one of a radial hole and another hole oriented at 90° from the radial hole. In order to move a sheath from one hole to the other, it must by moved away from the armature, against the force of the spring, brought to the other position 90° away, and there slips into the other hole by the spring force.

According to U.S. Pat. No. 6,709,121 B1, a similarly constructed pivotable block is arrested in the use position, in which the ribs are extended more or less radially, by a latch lever. In order to fold the soft box according to this document, the latch lever is pivoted towards the rear side of the soft box, i.e., towards the armature, thereby releasing the pivotable block holding the respective rib.

It has been found that either mechanism is not particularly convenient to use. The former structure requires that each of the sheaths is readily accessible, and easily movable outwards; but neither condition is usually fulfilled, or requires restrictions on the design of the soft box which render its use inconvenient. The latter structure requires pivoting the latch levers towards the armature, where space is crowded already, again requiring restrictions on the design of the soft box or the armature.

SUMMARY

It is an object of the present invention to provide a soft box mount which alleviates or overcomes the drawbacks of the prior art.

The object is solved by the soft box mount, the soft box, the method of expanding or collapsing a soft box, and the use of a soft box mount according to the appended independent claims. Preferable embodiments are defined in the dependent claims.

According to a first aspect of the invention, the soft box mount includes a receiver block for receiving an expander strut of a soft box, wherein the receiver block includes, arranged in this order, an inward part, a transverse pivot axis, and an outward part, the outward part of the receiver block being configured to receive a proximal end of the expander strut; and a bar block which is configured to be movable between a first, non-use position, in which the inward part of the receiver block may intrude into a recessed part of the bar block, and a second, use position, in which a non-recessed part of the bar block urges, from a light source side, the inward part of the receiver block to assume a position radially inward of the pivot axis of the receiver block, thereby urging the outward part of the receiver block to assume a position radially outward of the pivot axis of the receiver block, thereby in turn expanding the soft box. The soft box mount may further include a spring biasing the bar block towards a radially outward side, to the use position. The soft box mount may further include a radially oriented press button, which is configured to allow a user to compress the spring, thereby allowing the bar block to move to its non-use position.

According to a further aspect, a soft box mount arrangement includes one or more of such soft box mounts, and a mounting ring holding the one or more soft box mounts, wherein the press button extends through the mounting ring. Alternatively, the ring may extend substantially in a plane, and the one or more soft box mounts are fixed to the ring from one side. The motion of the bar blocks, with or without press buttons, is largely parallel to the ring plane of the soft box mount arrangement. In this variant, the soft box mounts are modules which may be screwed, bolted, adhered, or otherwise fixed individually, in any number, to the mounting ring, enhancing design flexibility.

According to a further aspect, a soft box includes one or more soft box mounts or the soft box mount arrangement described above, a plurality of expander struts, and an at least partially light reflecting sheet material in use expanded by the expander struts. In use, the light emitted from the light source will in part impinge on the at least partially light reflecting sheet material, and the reflected part will be directed towards the scene to be photographed, or filmed, as the case may be. The soft box may further include a partially transparent light diffuser arrangement in use located between the expander struts, such as known from document DE 10 2013 004 665 A1 of the present inventor, which is incorporated hereinto by reference inasmuch the diffuser is concerned. The soft box may alternatively or additionally include a light directing grid mounted, in use, between distal ends of the expander struts, such as known from document DE 20 2009 010 094 U1 of the present inventor, which is incorporated hereinto by reference inasmuch the light directing grid is concerned. Furthermore, fastening means may be provided near distal ends of the outward parts of the receiver blocks, such as screw holes for inserting screws for fixing the expander struts in axial holes in said outward parts.

According to still further aspects, a method of expanding the soft box described above comprises pivoting the expander struts, while received in their respective receiver blocks, outwards, thereby urging the inward parts of the respective receiver blocks out of the respective recess of the respective bar blocks, and moving the respective bar blocks into their use positions; a method of collapsing the soft box described above comprises moving the bar blocks into their non-use positions, whereby the inward parts of the respective receiver blocks are allowed to intrude into the respective recesses of the bar blocks, pivoting outwardly; and the use of the soft box mount or the soft box mount arrangement, respectively, described above for expanding or collapsing the soft box includes moving the respective bar blocks of the soft box mounts from their non-use position to their use position, or vice versa, respectively.

The soft box usually includes three or more expander struts, and one soft box mount for each of same. In particular, the soft box may include an even number such as four, six, or eight of soft box mounts of the type described above. These may, but need not, or not all be arranged in a radial fashion with respect to the light source. However, a radial orientation is preferred over other, non-radial orientations.

BRIEF DESCRIPTION OF THE FIGURES

Embodiments of the invention are explained below in conjunction with the appended drawings:

FIG. 5 illustrates another embodiment of a soft box mount, fixed on a ring; and

DETAILED DESCRIPTION

Figure 1:
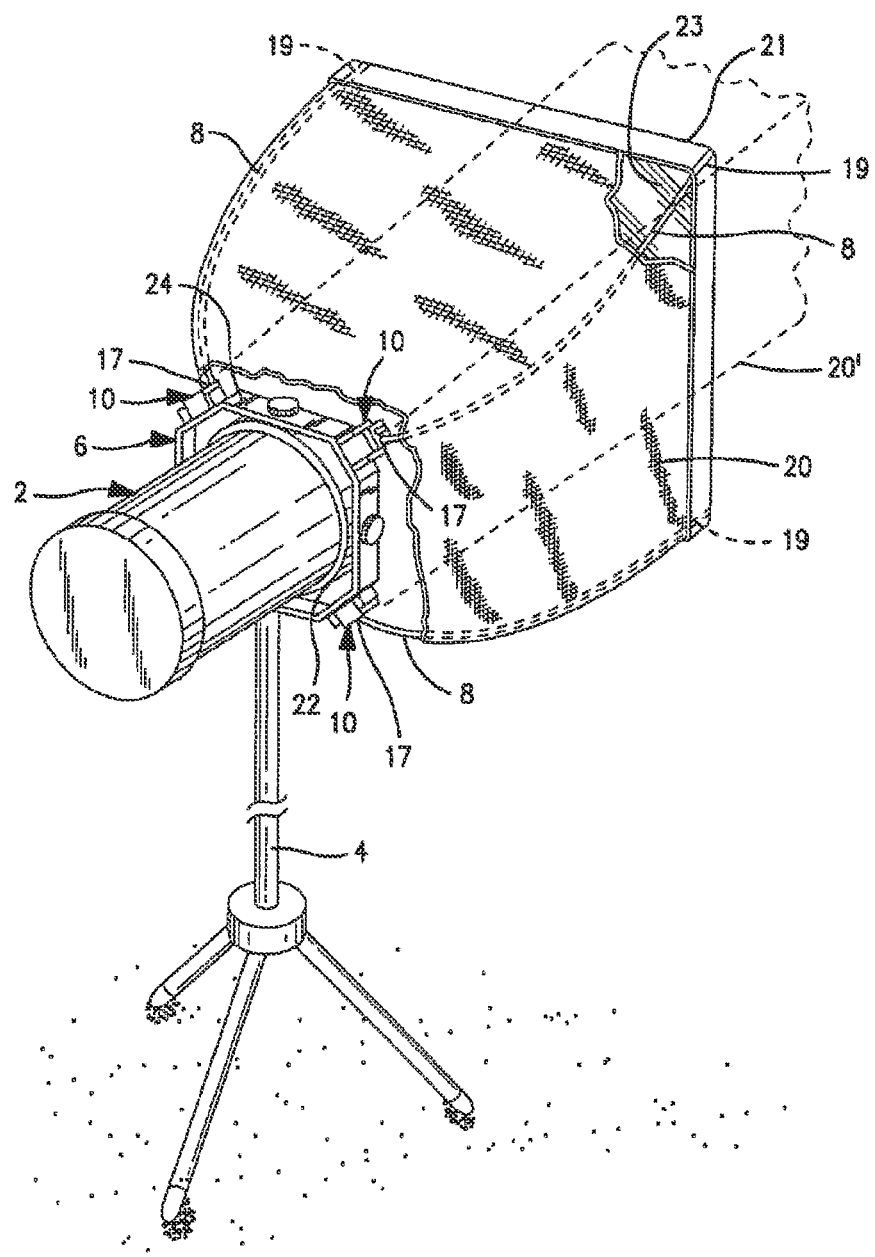
FIG. 1 illustrates a general view of a soft box mounted in front of a light source according to a prior art.

In the conventional soft box 20 illustrated in FIG. 1, four cloth-clad rods 8 which extend from the soft box are inserted into holes 17 of blocks 10 which, in turn, are fixed in position to a spotlight source 2 by means of a frame 6. The frame 6 is formed by a metal sheet strip 24 and fastened to a stand 4. The light emission aperture of the spotlight source 2 is enclosed by a mounting ring 22 to which the frame 6 is releasably attached. The light emission aperture 21 of the soft box comprises a translucent covering 23 and receiver 19 for accommodating the rods 8. The blocks 10 are tiltable, allowing the rods 8 to be collapsed (position 20' of the soft box); and in their outwardly tilted positions are retained by respective latch levers (not shown). Note that the cloth may be partially metallized on the inner side of the soft box.

Figure 2:
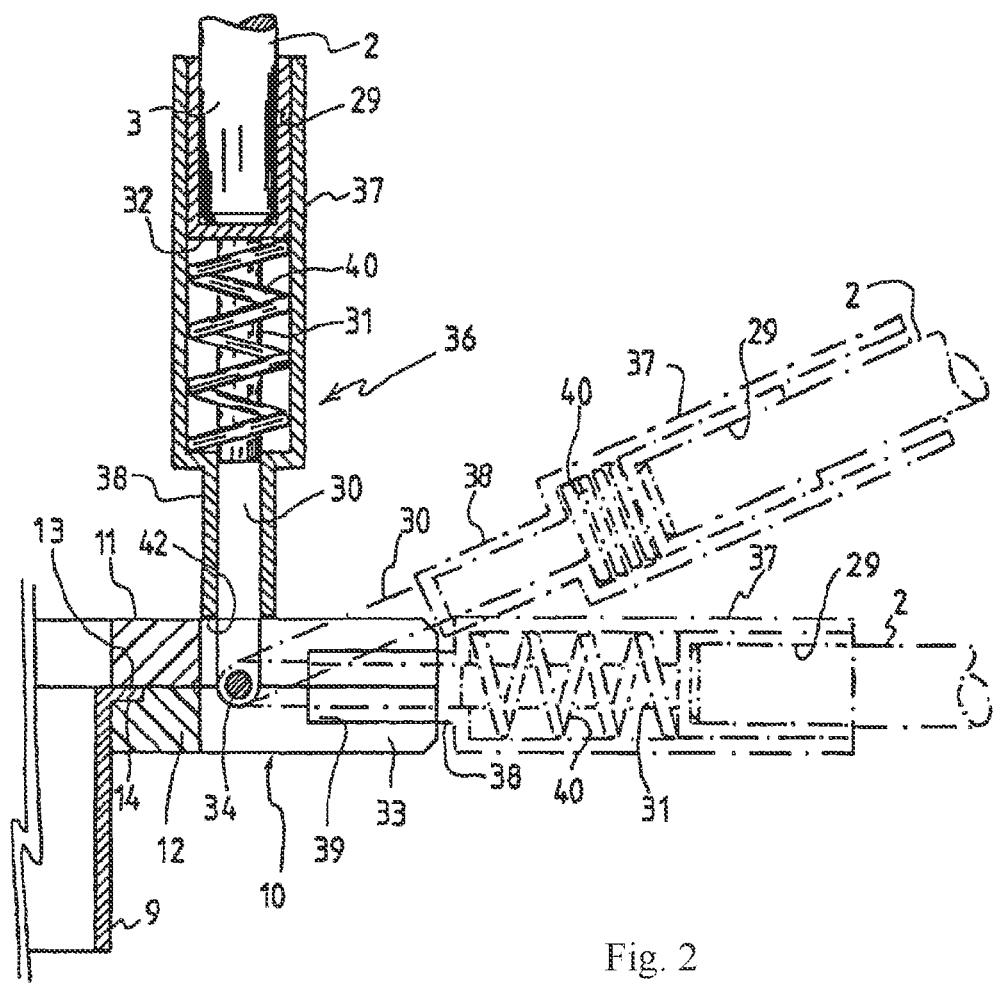
FIG. 2 illustrates a detailed view of a soft box mount according to another prior art.

A conventional ring shaped armature 10 as shown in cross-section in FIG. 2 is formed of two rings 11 and 12 assembled to one another in facing condition. A disk 13 is mounted rotatably in a groove 14 in ring 12 and is held in place by the assembly of rings 11 and 12. Disk 13 bears sleeve 9 which extends through rings 11 and 12 and projects beyond ring 12. The proximal end 3 of each of ribs 2 (corresponding to rods 8 of FIG. 1) is removably inserted into a socket 29 mounted on a flat arm 30 formed at the end of a cylindrical portion 31 connected to the bottom 32 of socket 29. A locking assembly 36 is mounted on each socket 29 for locking it in a first position, which in this case is radial to the ring shaped armature, whereas a second position is parallel to the axis of the ring shaped armature 10. Locking assembly 36 comprises a sleeve 37 mounted on the socket 29 and its cylindrical portion 31 for reciprocal motion thereon. The end of sleeve 37 which is opposed to socket 29 has a reduced diameter portion 38 which allows passage thereof along the arm 30 and cylindrical portion 31 of socket 29 and the free end of which is inserted into a peripheral radial aperture 39 formed in rings 11 and 12 along a portion of slots 33. A spring 40 is installed in the sleeve 37 between the bottom 32 of socket 29 and the reduced diameter portion 38. The outer surface of sleeve 37 is engine turned as at 42 to facilitate handling. This structure functions as follows: Insertion of the reduced diameter portion 38 of sleeve 37 into the peripheral radial aperture 39 of armature 10 under the bias of spring 40 assures locking of socket 39 in its first position (dash-dotted lines). Unlocking is done by pulling sleeve 37 to withdraw the reduced portion 38 out of the peripheral radial aperture 29 against the bias of spring 40 whereby the socket 29 and its locking assembly 36 may be pivoted in the second position (full lines) where the free end of the reduced portion bears against the outer surface of ring 11. An intermediate position between the first and second position is likewise shown in dash-dotted lines.

The inner surface is partially specularly reflective. In this context, an ideal specular reflection would be that of an ideal mirror, meaning that each impinging ray is reflected only in one direction symmetrically opposite to that of the impinging ray.

In reality, the inner surface of the surrounding cloth is made somewhat reflective is as much the light cone emitted from an illuminated spot is narrower than that of an ideally diffuse reflector (having an angular intensity distribution following a cosine function, e.g., $I(\alpha)=I_0 \cdot \cos(\alpha)$ with intensity I and angle $\alpha$ to the normal). A function narrower than a cosine function may be modeled as a function $\cos^k(\alpha)$ with k>1; or conversely as a function $\cos^{1/q}(\alpha)$ with q=1/k, with 0<q<1. Thus, the smaller q, the more specular the reflection, approaching ideal specular reflection as q approaches 0. Usually, the angle of incidence differs quite substantially from the normal, and the resulting formulae become asymmetric with respect to the two angles involved. For the purposes of this application, it suffices to consider that the actual reflection is neither ideally diffuse, nor ideally specular, but rather a suitable intermediate there between. If there is a diffuser within (or at the outer plane) of the soft box, this will further smoothen out the angular intensity distribution measured outside of the soft box; and if there is a light guiding grid mounted at the light emission aperture of the soft box, this will tend to increase the above exponent k of the emitted light cone.

Figure 3A:
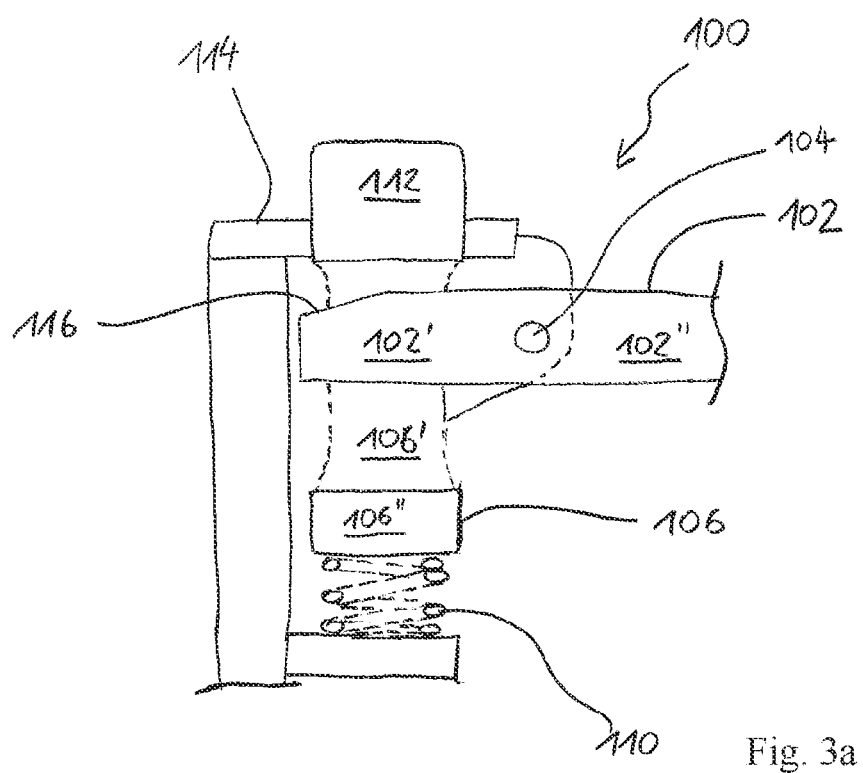
FIGS. 3a-c illustrate side views of an embodiment of the present invention in three stages of its being moved between a non-use position and a use position.
Figure 3B:
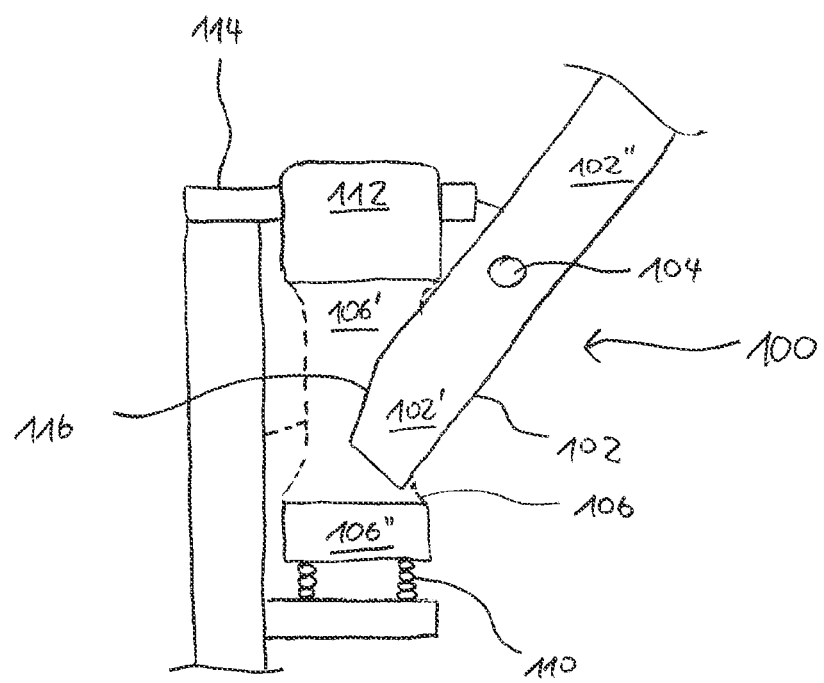

According to an embodiment of the present invention, a soft box mount 100 includes a receiver block 102 for receiving an expander strut of a soft box (not shown), wherein the receiver block 102 includes, in this order, an inward part 102', a hole for a transverse pivot axis 104, and an outward part 102", the outward part 120" of the receiver block 102 being configured to receive a proximal end of the expander strut (not shown); and a bar block 106 which is configured to be movable between a first, non-use position (shown in FIG. 3a), in which the inward part 102' of the receiver block 102 may intrude into a recessed part 106' of the bar block 106, and a second, use position (shown in FIG. 3c), in which a non-recessed part 106" of the bar block 106 urges, from a light source side, the inward part 102' of the receiver block 102 to assume a position radially inward of the pivot axis 104 of the receiver block 102, thereby urging the outward part 102" of the receiver block 102 to assume a position radially outward of the pivot axis 104 of the receiver block 102. An intermediate, transitory position is shown in FIG. 3b. It should be noted that the receiver block 102 has, at its distal end, a structure allowing it to receive an expander strut; such as an axial hole, in which case the expander strut may be a steel rod sufficiently thin to be resilient, so that it bends somewhat when the soft box is in its use position, thereby tensioning the soft box to avoid slack.

Figure 3C:
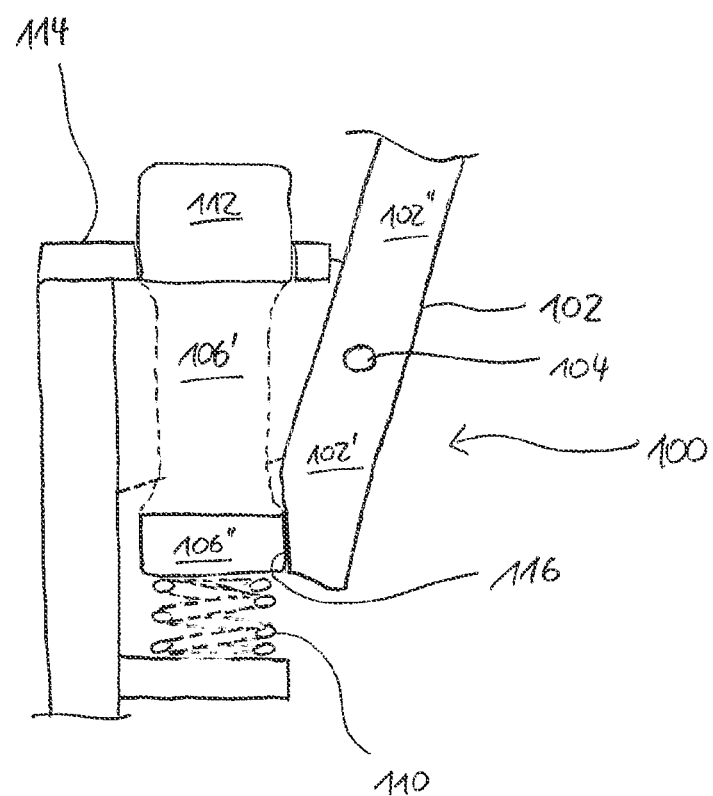

There may be a biasing spring 110 at the radially inner end of the bar block 106; the same function may be provided by a resilient cushion separating an outer ring on the press button 112 from the supporting ring 114, or by some other resilient means. The outer end of the inward part 102' of the receiver block 102 may be chamfered 116, to thereby stabilize its positioning in the second, use position as shown in FIG. 3c.

Figure 4A:
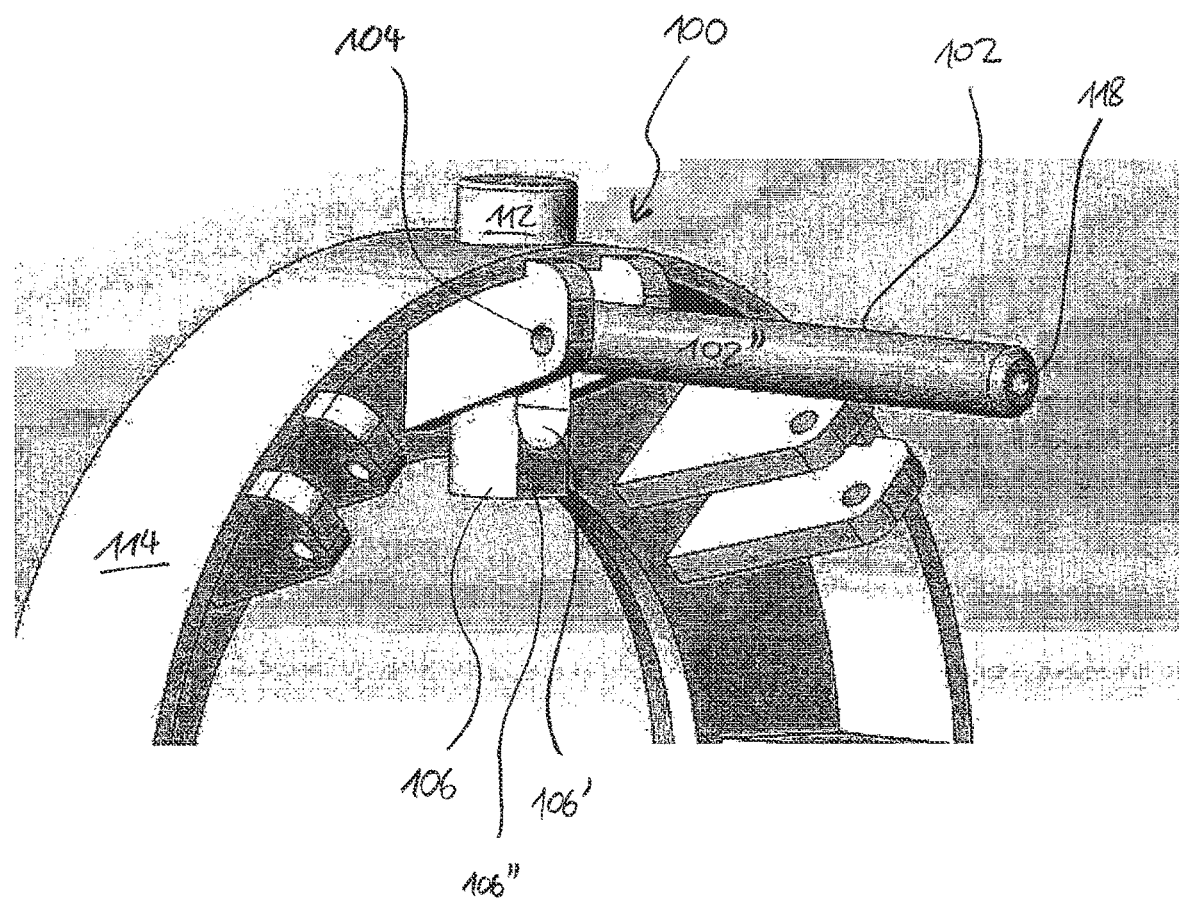
FIGS. 4a-c illustrate perspective views of a soft box mount assembly of the present invention in a non-use position, in an intermediate position, and in a use position of the single soft box mount shown.
Figure 4B:
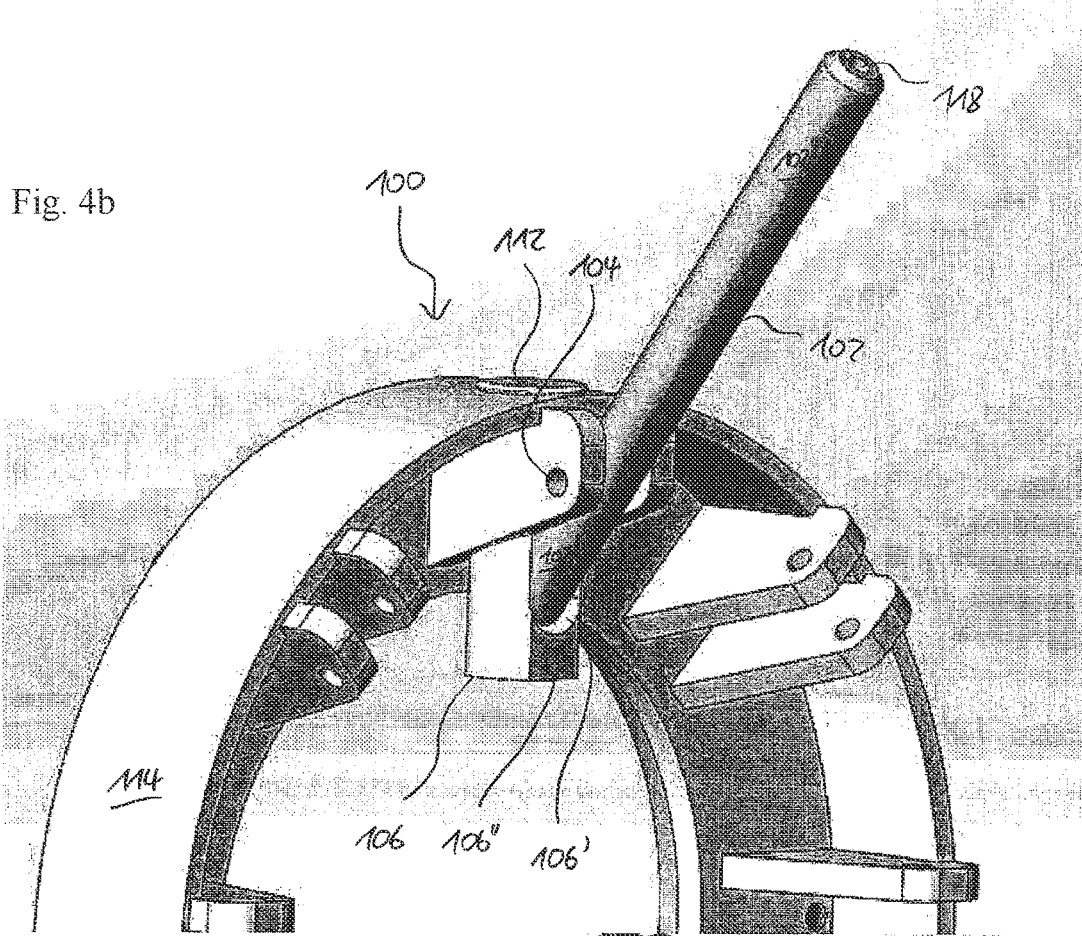
Figure 4C:
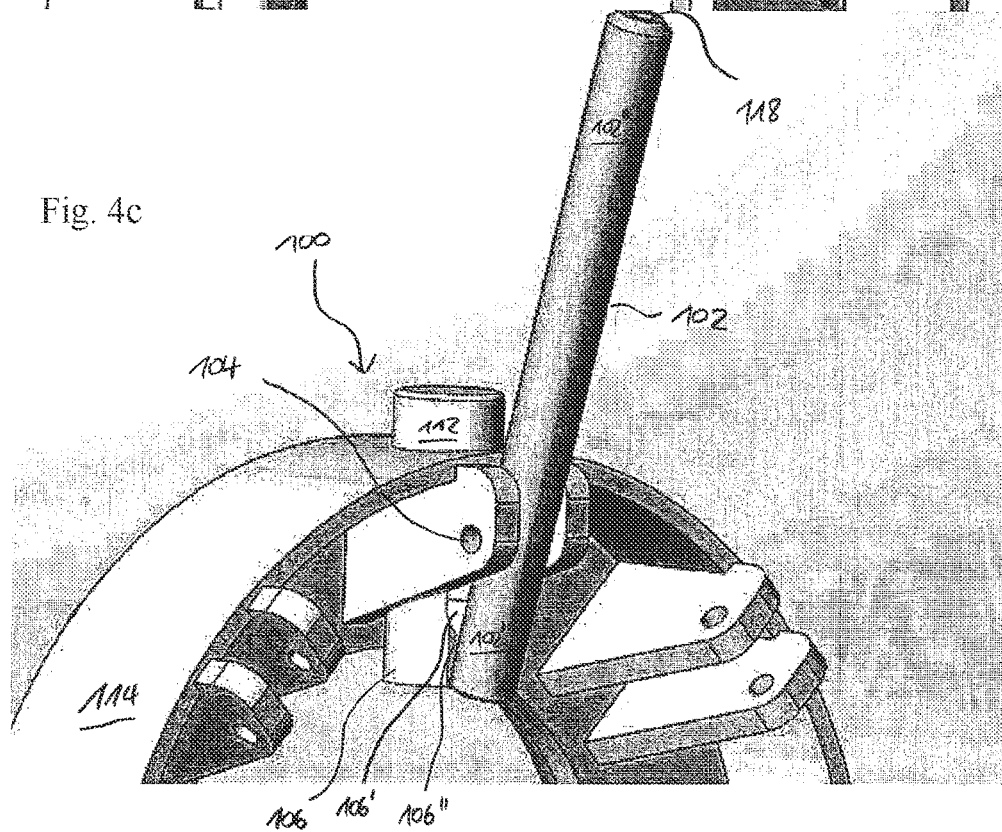

A soft box mount assembly, with just one of the mounted rods shown for simplicity, is depicted in FIGS. 4a-c. The reference numerals correspond to those of FIGS. 3a-c. In this embodiment, there are eight soft box mounts 100 altogether, arranged evenly spaced around the mounting ring 114, but only one of the soft box mounts is shown for simplicity, and none of the biasing springs. In this embodiment, the distal end of the receiver block has an axial hole 118 for receiving an expander strut. Naturally, there are additional holes for the press buttons of the other soft box mounts. It is not strictly required that the spacing between the soft box mounts is the same everywhere on the circumference; nor is the invention limited to exactly eight soft box mounts. Rather, any number, in particular even number, larger than two is suitable. Furthermore, the orientations of the soft box mounts may not all be exactly radial; rather, any other orientation is possible, as long as the non-use rod positions allow for a collapsed soft box. It may be noted that in this embodiment, the mounting ring has the shape of a hollow cylinder, which is very short compared to its diameter.

Another embodiment of a soft box mount 200, and soft box mount arrangement is shown in FIG. 5. Here, the entire module 214 including the receiver block 202 and the bar block 206 is fixed (blind screw holes 220, threaded through holes 222; alternatively bolted, adhered, or otherwise) to a flat mounting ring 218. This allows a rather flexible positioning of the soft box mount modules around the circumference. This variant also allows to form guide grooves and/or rails on the mounting ring, and corresponding rails and/or grooves on the modules, for slidingly attaching the latter. Incidentally, the other components correspond to those of the first embodiment, and their reference numerals are: 202' inward part of receiver block, 202" outward part of receiver block, 204 pivot axis, 206, 206' and 206" bar block, 210 spring, 212 press button, 216 chamfer.

Figure 6:
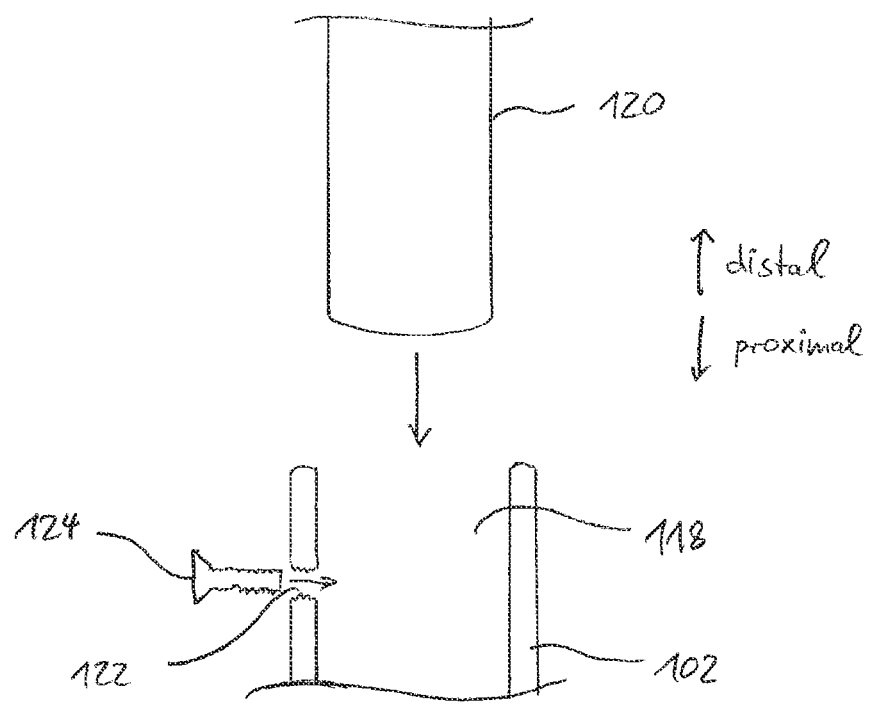
FIG. 6 illustrates a detail of the outward part of the receiver block.

A detail of the outward part of a receiver block 102 is shown in FIG. 6, where a screw hole 122 is formed in the vicinity of its distal end, so that an expander strut 120 inserted therein may be fixed in place by way of a screw 124 inserted through the screw hole, pressing on the proximal end of the expander strut 120 from the side, thereby increasing the friction and inhibiting its slipping out of the distal receiving opening 118.

The invention has been described by way of examples, which are, however, not to be construed as limiting the invention, and all variants and modifications coming within the spirit of the invention are to be considered as being encompassed thereby.

What is claimed is:

1. A soft box mount, including:
   a receiver block for receiving an expander strut of a soft box, wherein the receiver block includes, in order, an inward part, a transverse pivot axis, and an outward part, the outward part of the receiver block being configured to receive a proximal end of the expander strut; and
   a bar block which is configured to be movable between a first, non-use position, in which the inward part of the receiver block may intrude into a recessed part of the bar block, and a second, use position, in which a non-recessed part of the bar block urges, from a light source side, the inward part of the receiver block to assume a position radially inward of the pivot axis of the receiver block, thereby urging the outward part of the receiver block to assume a position radially outward of the pivot axis of the receiver block.

2. The soft box mount of claim 1, further including a spring biasing the bar block towards a radially outward side, to the use position.

3. The soft box mount of claim 2, further including a radially oriented press button, which is configured to allow a user to compress the spring, thereby allowing the bar block to move to its non-use position.

4. The soft box mount of claim 3, further including at least one other like soft box mount and a mounting ring holding the one and the at least one other soft box mount to form a soft box mount arrangement, wherein the press buttons extend through the mounting ring.

5. The soft box mount of claim 1, further including at least one other like soft box mount and a mounting ring holding the one and the at least one other soft box mount to form a soft box mount arrangement, wherein the mounting ring extends substantially in a plane, and the one and the at least one other soft box mount are fixed to the mounting ring from one side of the ring.

6. A soft box, including:
   the soft box mount arrangement, comprising:
      a receiver block for receiving an expander strut of a soft box, wherein the receiver block includes, in order, an inward part, a transverse pivot axis, and an outward part, the outward part of the receiver block being configured to receive a proximal end of the expander strut;
      a bar block which is configured to be movable between a first, non-use position, in which the inward part of the receiver block may intrude into a recessed part of the bar block, and a second, use position, in which a non-recessed part of the bar block urges, from a light source side, the inward part of the receiver block to assume a position radially inward of the pivot axis of the receiver block, thereby urging the outward part of the receiver block to assume a position radially outward of the pivot axis of the receiver block;
      a spring biasing the bar block towards a radially outward side, to the use position; a radially oriented press button, which is configured to allow a user to compress the spring, thereby allowing the bar block to move to its non-use position; and
      at least one other like soft box mount and a mounting ring holding the one and the at least one other soft box mount to form a soft box mount arrangement, wherein the press buttons extend through the mounting ring;

a plurality of expander struts; and an at least partially light reflecting sheet material in use expanded by the expander struts.

7. The soft box of claim 6, further including a partially transparent light diffuser arrangement in use located between the expander struts.

8. The soft box of claim 7, wherein fastening means are formed near distal ends of the outward parts of the receiver blocks, such as screw holes for inserting screws therein in order to fix the distal ends of the expander struts to the receiver blocks.

9. The soft box of claim 8, wherein fastening means are formed near distal ends of the outward parts of the receiver blocks, such as screw holes for inserting screws therein in order to fix the distal ends of the expander struts to the receiver blocks.

10. The soft box of claim 6, further including a light directing grid mounted, in use, between distal ends of the expander struts.

11. The soft box of claim 6, wherein fastening means are formed near distal ends of the outward parts of the receiver blocks, such as screw holes for inserting screws therein in order to fix the distal ends of the expander struts to the receiver blocks.

12. A soft box, including:
    a soft box mount arrangement, comprising:
        a receiver block for receiving an expander strut of a soft box, wherein the receiver block includes, in order, an inward part, a transverse pivot axis, and an outward part, the outward part of the receiver block being configured to receive a proximal end of the expander strut;
        a bar block which is configured to be movable between a first, non-use position, in which the inward part of the receiver block may intrude into a recessed part of the bar block, and a second, use position, in which a non-recessed part of the bar block urges, from a light source side, the inward part of the receiver block to assume a position radially inward of the pivot axis of the receiver block, thereby urging the outward part of the receiver block to assume a position radially outward of the pivot axis of the receiver block; and
        at least one other like soft box mount and a mounting ring holding the one and the at least one other soft box mount to form a soft box mount arrangement, wherein the mounting ring extends substantially in a plane, and the one and the at least one other soft box mount are fixed to the mounting ring from one side of the ring;
    a plurality of expander struts; and
    an at least partially light reflecting sheet material in use expanded by the expander struts.

13. The soft box of claim 12, further including a partially transparent light diffuser arrangement in use located between the expander struts.

14. The soft box of claim 13, wherein fastening means are formed near distal ends of the outward parts of the receiver blocks, such as screw holes for inserting screws therein in order to fix the distal ends of the expander struts to the receiver blocks.

15. The soft box of claim 12, further including a light directing grid mounted, in use, between distal ends of the expander struts.

16. The soft box of claim 15, wherein fastening means are formed near distal ends of the outward parts of the receiver blocks, such as screw holes for inserting screws therein in order to fix the distal ends of the expander struts to the receiver blocks.

17. The soft box of claim 12, wherein fastening means are formed near distal ends of the outward parts of the receiver blocks, such as screw holes for inserting screws therein in order to fix the distal ends of the expander struts to the receiver blocks.

\* \* \* \* \*